(12) United States Patent
Baumheinrich et al.

(10) Patent No.: US 10,939,050 B2
(45) Date of Patent: Mar. 2, 2021

(54) METHOD OF OPERATING A CAMERA SYSTEM AND CAMERA SYSTEM

(71) Applicant: OSRAM Opto Semiconductors GmbH, Regensburg (DE)

(72) Inventors: Thorsten Frank Baumheinrich, Altdorf (DE); Mikko Perälä, Tampere (FI); Désirée Queren, Neutraubling (DE)

(73) Assignee: OSRAM OLED GmbH, Regensburg (DE)

( * ) Notice: Subject to any disclaimer, the term of this patent is extended or adjusted under 35 U.S.C. 154(b) by 0 days.

(21) Appl. No.: 16/485,671

(22) PCT Filed: Feb. 22, 2018

(86) PCT No.: PCT/EP2018/054415
§ 371 (c)(1),
(2) Date: Aug. 13, 2019

(87) PCT Pub. No.: WO2018/154002
PCT Pub. Date: Aug. 30, 2018

(65) Prior Publication Data
US 2019/0373158 A1    Dec. 5, 2019

(30) Foreign Application Priority Data

Feb. 24, 2017   (DE) .................. 10 2017 103 882

(51) Int. Cl.
*H04N 5/235* (2006.01)
*H04N 5/355* (2011.01)
*H04N 5/374* (2011.01)

(52) U.S. Cl.
CPC ......... *H04N 5/2354* (2013.01); *H04N 5/2353* (2013.01); *H04N 5/35563* (2013.01); *H04N 5/374* (2013.01)

(58) Field of Classification Search
CPC .................................................. H04N 5/2354
USPC ........................................................ 348/371
See application file for complete search history.

(56) References Cited

U.S. PATENT DOCUMENTS

| 2005/0178950 | A1  | 8/2005 | Yoshida |
| 2008/0218618 | A1* | 9/2008 | Pfeffer ................. H04N 5/2256 348/294 |
| 2015/0227790 | A1  | 8/2015 | Smits |

FOREIGN PATENT DOCUMENTS

WO    2007/049176 A1    5/2007

* cited by examiner

*Primary Examiner* — Joel W Fosselman
(74) *Attorney, Agent, or Firm* — DLA Piper LLP (US)

(57) ABSTRACT

A method of operating a camera system having an image sensor including a plurality of activatable image elements, wherein an active image element converts incoming radiation into readable image information, a radiation source including a plurality of activatable radiation elements, each active radiation element emitting electromagnetic radiation, and an integrated circuit coupled to the radiation source, the method including capturing at least one image, wherein during capturing of each single image different subsets of the image elements are successively each once activated and deactivated again after a predetermined exposure time, different subsets of the radiation elements are successively activated by the integrated circuit and deactivated again after a predetermined emission time, and each subset of the image elements is assigned a subset of the radiation elements activated with temporal overlap so that the active radiation elements emit radiation while the associated active image elements receive image information.

20 Claims, 8 Drawing Sheets

METHOD OF OPERATING A CAMERA SYSTEM AND CAMERA SYSTEM

TECHNICAL FIELD

This disclosure relates to a method of operating a camera system. In addition, a camera system.

BACKGROUND

There is a need to provide an energy-saving and flexible method of operating a camera system as well as a camera system with which such a method can be performed.

SUMMARY

We provide a method of operating a camera system having an image sensor, a radiation source and an integrated circuit, wherein the image sensor includes a plurality of activatable image elements, wherein an active image element converts incoming radiation into readable image information, the radiation source includes a plurality of activatable radiation elements, each active radiation element emitting electromagnetic radiation, the integrated circuit is electrically coupled to the radiation source to control the radiation source, the method including capturing at least one image, wherein during capturing of each single image different subsets of the image elements are successively each once activated and deactivated again after a predetermined exposure time, different subsets of the radiation elements are successively activated by the integrated circuit and deactivated again after a predetermined emission time, and each subset of the image elements is assigned a subset of the radiation elements activated with temporal overlap so that the active radiation elements emit radiation while the associated active image elements receive image information.

We also provide a camera system including an image sensor, a radiation source and an integrated circuit, wherein the radiation source includes a pixelated LED chip, the image sensor includes a plurality of activatable image elements, each image element being configured to receive image information, the radiation source includes a plurality of activatable radiation elements, and each radiation element is configured to emit electromagnetic radiation, and to control the radiation source, the integrated circuit is electrically coupled to the radiation source, wherein the camera system is configured to perform a method having an image sensor, a radiation source and an integrated circuit, wherein the radiation source includes a pixelated LED chip, the image sensor includes a plurality of activatable image elements, wherein an active image element converts incoming radiation into readable image information, the radiation source includes a plurality of activatable radiation elements, and each active radiation element emits electromagnetic radiation, the integrated circuit is electrically coupled to the radiation source to control the radiation source, wherein the method includes capturing at least one image, wherein during capturing of each single image, different subsets of the image elements are successively each once activated and deactivated again after a predetermined exposure time, different subsets of the radiation elements are successively activated by the integrated circuit and deactivated again after a predetermined emission time, and each subset of the image elements is assigned a subset of the radiation elements that are activated with temporal overlap so that the active radiation elements emit radiation while the associated active image elements receive image information.

We further provide a method of operating a camera system having an image sensor, a radiation source and an integrated circuit, wherein the radiation source includes a pixelated LED chip, the image sensor includes a plurality of activatable image elements, wherein an active image element converts incoming radiation into readable image information, the radiation source includes a plurality of activatable radiation elements, and each active radiation element emits electromagnetic radiation, the integrated circuit is electrically coupled to the radiation source to control the radiation source, wherein the method includes capturing at least one image, wherein during capturing of each single image, different subsets of the image elements are successively each once activated and deactivated again after a predetermined exposure time, different subsets of the radiation elements are successively activated by the integrated circuit and deactivated again after a predetermined emission time, and each subset of the image elements is assigned a subset of the radiation elements that are activated with temporal overlap so that the active radiation elements emit radiation while the associated active image elements receive image information.

REFERENCE CHARACTER LIST 1 image sensor
2 radiation source
3 integrated circuit
4 image
5 further integrated circuit
10 image element
11 subset of the image elements 10
20 radiation element
21 subset of the radiation elements 20
35 control unit
36 communication unit
40 subregion of the image 4
100 camera System

DETAILED DESCRIPTION

Our camera system may comprise an image sensor, a radiation source and one or more integrated circuits. The camera system is, for example, a digital camera system or a digital video camera system that can also be installed in a mobile phone or tablet PC, or a camera system for a system camera or a camera system for a single-lens reflex camera. The camera system is especially configured to capture images in the visible spectral range or infrared spectral range or in the UV range.

The image sensor may have a plurality of activatable image elements, wherein an active, i.e. activated, image element converts electromagnetic radiation incident on the image element into readable image information. The image sensor, for example, is a pixelated image sensor. Therefore, an image element is in particular a pixel of the image sensor. An image element or pixel can in turn be composed of several subpixels, for example, a green, red and blue subpixel, each of which is configured to detect light of the specified color.

The image elements can, for example, be arranged in the form of a square or rectangular matrix or a chessboard. For example, the image sensor comprises at least 1000 or at least 10000 or at least $10^6$ image elements.

For example, the image sensor comprises one, in particular exactly one, pixelated semiconductor chip, each pixel having a pn-junction. The image elements are then realized by pixels of the semiconductor chip. To activate an image element, for example, voltage is applied to the image element in the reverse direction. Electromagnetic radiation incident on the image element generates a hole and an electron in the semiconductor material by the internal photo effect that are spatially separated from each other due to the applied voltage. In this way, electromagnetic radiation is converted into electrical charge. The amount of electrical charge generated correlates with the number of photons striking the pixel while the pixel is active. The electrical charge generated then represents, for example, the image information that can be digitally processed.

The radiation source may comprise a plurality of activatable radiation elements, each activated or active radiation element emitting electromagnetic radiation. The radiation source is, for example, a pixelated radiation source such as a pixelated LED chip or several LED chips arranged next to each other, for example, at the corners of a rectangular grid. The radiation source may be a flash of the camera system. Each radiation element then corresponds, for example, to one pixel, whereby each pixel can be made up of three subpixels.

The radiation elements can, for example, be arranged in the form of a square matrix or rectangular matrix or in the form of a chessboard. For example, the radiation source comprises at least four or at least 100 or at least 10000 or at least $10^6$ radiation elements. However, it is also possible that the radiation source comprises a number of individual LED chips, with each radiation element then comprising exactly one LED chip, for example.

Particular preferably, the radiation source comprises two or more, in particular exactly two, pixelated LED chips. The radiation elements are then formed by pixels of the LED chips. Each pixelated LED chip, for example, contains at least one of the number of radiation elements specified in the last paragraph.

The individual radiation elements are activated, for example, by applying a voltage and/or a current that generates electromagnetic radiation in the radiation element. The electromagnetic radiation generated is preferably radiation in the visible range or in the infrared range or in the UV range.

An LED chip or semiconductor chip means an element that can be handled separately and contacted electrically. An LED chip or semiconductor chip is created in particular by separation from a wafer composite. In particular, side surfaces of such a chip then show traces from the separation process of the wafer compound, for example. An LED chip or semiconductor chip preferably comprises exactly one originally contiguous region of a semiconductor layer sequence grown in a wafer composite. The semiconductor layer sequence of the chip is preferably formed contiguously. An LED chip or semiconductor chip comprises an active layer in the semiconductor layer sequence. For example, the lateral expansion of the chip, measured parallel to the main extension direction of the active layer, is at most 1% or at most 5% greater than the lateral expansion of the active layer or of the semiconductor layer sequence. In a pixelated chip, for example, the active layer is segmented according to the pixels. The active layer of the semiconductor layer sequence comprises in particular at least one pn junction and/or at least one quantum well structure.

The integrated circuit may be electrically coupled to the radiation source to control the radiation source. By the integrated circuit, for example, the individual radiation elements are supplied with voltage. The integrated circuit and the radiation source are preferably configured such that the individual radiation elements can be controlled individually and independently of the other radiation elements.

For example, the radiation source is arranged directly or indirectly on the integrated circuit so that the integrated circuit simultaneously forms a carrier for the radiation source and mechanically stabilizes the radiation source. However, it is also possible that the integrated circuit is located at a distance from the radiation source in the camera system and does not provide mechanical support for the radiation source.

The method of operating the camera system may comprise capturing at least one image, wherein during capturing of each single image different subsets of the image elements are successively each once activated and deactivated again after a predetermined exposure time. Thus, during the exposure time, the image elements collect image information. The image elements are activated and deactivated, for example, by applying and switching off a voltage in the reverse direction. Preferably, image information are only collected while the image elements are active, i.e. only during the exposure time.

For example, the image sensor thus comprises an electronically controlled shutter mechanism, for example, a so-called rolling shutter that can be used to set which image elements are exposed or active at which point in time.

For example, each subset of the image elements contains exactly one image element or at least two image elements. Preferably, each subset of the image elements comprises at most 50% or at most 10% or at most 1% or at most 1‰ of the total image elements of the image sensor. Alternatively or additionally, each subset of the image elements comprises at least 0.01‰ or 0.1‰ or 1‰ of the total image elements. For example, the different subsets of the image elements are disjunct from each other. However, it is also possible that different subsets of the image elements comprise one or more identical image elements.

Preferably, when activating a subset of the image elements, all image elements of this subset are activated simultaneously or almost simultaneously and/or deactivated simultaneously or almost simultaneously. "Nearly simultaneously" means, for example, that the maximum time interval for the activation or deactivation of two image elements of a subset is not more than 1 ns or not more than 50 ns or not more than 100 ns.

While capturing an image, several subsets of the image elements can be active at the same time. However, the subsets of the image elements are preferably activated and deactivated at different times during capturing an image. For example, the time interval between activation of a subset of the image elements and activation of the subset of the image elements that follows next in time is not more than 1 ms or not more than 1 µs or not more than 100 ns. Alternatively or additionally, the time interval is at least 1 ns or at least 500 ns or at least 1 µs.

For example, the exposure time of each individual subset of the image elements is not more than 1 s or not more than 0.01 s or not more than 1 ms or not more than 0.01 ms or not more than 1 μs. Alternatively or additionally, the exposure time of each individual subset of the image elements is at least 1 μs or at least 0.1 ms.

Preferably, a single image is captured by activating and deactivating the various image elements only once at a time. For example, all image elements of the image sensor are activated once and deactivated once for this purpose.

Different subsets of the radiation elements may be successively activated and deactivated again by the control unit after a specified emission time during capturing of the same image. For example, the radiation elements are activated by applying a voltage and/or a current, whereupon electromagnetic radiation is emitted. After the emission time has elapsed, the voltage is then switched off again, for example. Also, it is possible for several subsets of the radiation elements to be simultaneously active. In particular, however, different subsets of the radiation elements are activated and deactivated at different times during capturing of the image. In addition, the radiation elements assigned to a subset are preferably activated and/or deactivated simultaneously or almost simultaneously.

In addition, the properties specified for the subsets of the image elements, for example, for the length of the exposure time, the time interval between activation of successive subsets of the image elements, the simultaneity of activation and deactivation of the image elements in subsets and the composition of the subsets of the image elements, apply analogously for the subsets of the radiation elements with respect to the emission time, the time interval between activation of successive subsets of the radiation elements, the simultaneity of activation and deactivation of the radiation elements in a subset and the composition of the subsets of the radiation elements. In particular, each subset of the radiation elements can thus consist of one or more radiation elements, wherein, for example, each subset of the radiation elements comprises, for example, at most 50% of the radiation elements.

Each subset of the image elements may be assigned a subset of the radiation elements during capturing of the image. The subset of the image elements and the associated subset of the radiation elements are activated with a temporal overlap so that the active radiation elements emit radiation while the associated active image elements receive image information.

For example, the subset of the radiation elements assigned to a subset of the image elements emits electromagnetic radiation continuously, while the subset of the image elements is active, i.e. receives image information. For this purpose, for example, the corresponding subset of the radiation elements is activated before or simultaneously with activation of the subset of the image elements. Deactivation of the subset of the radiation elements then preferably takes place at the same time or after deactivation of the subset of the image elements. In particular, therefore, the emission time of the associated active subset of the radiation elements is longer, for example, 5% to 20% or 3% to 30% longer, than the exposure time of the active subset of the image elements.

It is possible that a subset of the radiation elements is unambiguously assigned to each subset of the image elements. However, it is also possible that a subset of the radiation elements is simultaneously assigned to several subsets of the image elements so that the subsets of the radiation elements, for example, emit radiation continuously as long as one of the assigned subsets of the image elements is still active.

A camera system for the method of operating the camera system may comprise an image sensor, a radiation source and an integrated circuit. The image sensor may have a plurality of activatable image elements, wherein an active image element converts incoming radiation into readable image information. The radiation source may have a plurality of activatable radiation elements and each active radiation element may emit electromagnetic radiation. The integrated circuit may be electrically coupled to the radiation source for controlling the radiation source. The method may comprise capturing at least one image, whereby during capturing of a single image, different subsets of the image elements are each successively activated once and deactivated again after a predetermined exposure time. In addition, different subsets of the radiation elements may be successively activated by the control unit during capturing of the same image and deactivated again after a specified emission time. Each subset of the image elements may be assigned a subset of the radiation elements, wherein the subset of the image elements and the assigned subset of the radiation elements are activated with a temporal overlap so that the active radiation elements emit radiation while the associated active image elements receive image information.

Many image sensors for camera systems available on the market today such as CMOS or CCD image sensors, typically have an electronically controlled shutter mechanism, the so-called rolling shutter. For example, the image sensor is exposed or activated line by line and then read out. This means that at no time or only at very short times all lines are exposed or active at the same time. If a radiation source, for example, a flash such as a flash LED, is also used to capture an image, this radiation source usually remains switched on for the entire exposure time of all lines of the image sensor. This leads to thermal problems and at the same time to high battery or power consumption. In addition, brightness conditions in the respective image can be supported such that overexposure or underexposure of certain objects can be avoided, thus improving the image quality.

Another possibility is to switch on the radiation source only for a time window in which all lines are exposed or active at the same time. For sufficient radiation to reach the image sensor during this time window, this time window must be relatively long. However, this means that the exposure times of the individual lines of the image sensor must be very long, especially considerably longer than the time window. This method works best when the ambient light is weak so that the exposure time of the camera system or the exposure times of the individual lines must be set very long anyway.

We use a radiation source with a plurality of radiation elements, wherein different subsets of the radiation elements are activated and deactivated one after the other during the capturing of an image. In this example, only those subsets of the radiation elements are active that are functionally related to one or more simultaneously active subsets of the image elements. In particular, the method can be used to control the capturing of an image in a way that at a certain point during the capturing of an image only those radiation elements are active that are actually needed. This means, for example, that only those radiation elements are operated that illuminate the part of a scene that is captured by the active image elements.

For example, by exposing the image sensor line by line, only very specific areas of space are captured at certain points in time. If, for example, the radiation source is used as a flashlight, the method can be used to ensure that only those radiation elements are active at this time that illuminate the same area of space. In this sense, the method enables a particularly energy-saving and efficient operation of the camera system, which is useful, for example, in view of the limited battery capacity of mobile phones.

Alternatively or additionally, special optical effects during image capturing such as interference effects or depth effects can be achieved by sequentially activating and deactivating different subsets of the radiation elements and by correlating them with simultaneously active subsets of the image elements. For example, brightness gradients can be achieved in the captured images.

The method is also suitable for capturing fast-moving objects. If, for example, the object is to be illuminated with the flash light, control of the radiation elements can be selected so that only those radiation elements are active that illuminate the moving object.

No subset of the radiation elements must emit radiation during the capturing of an image over the entire period from the activation of the first activated subset of the image elements until the deactivation of the last activated subset of the image elements. In other words, no subset of the radiation elements must emit over the entire period in which image information is captured. This further increases the energy efficiency of the camera system.

When activating each individual subset of the image elements, a certain subregion of the image to be captured may be captured. If an area or solid angle is assigned to the image to be captured that is captured by the camera system to capture the image, this subregion is a specific part of the area or solid angle. For example, the subregion of the image taken by an active subset of the image elements does not exceed $1/10$ or $1/100$ or $1/1000$ or $1/10000$ of the total area or solid angle of the image. The image is a scene such as a portrait or a landscape.

The respectively assigned and simultaneously active subset of the radiation elements may emit radiation into the same subregion also captured by the assigned subset of the image elements. In particular, the subset of the radiation elements emits more radiation into this subregion than into other region of the image to be captured. For example, at least 50% or at least 80% or at least 90% or at least 95% of the radiation emitted by an active subset of the radiation elements is emitted in the same subregion as that captured by the subset or the subsets of the image elements assigned with that subset of the radiation elements. Emission of radiation into a certain image region is achieved, for example, by subordinating a lens to the radiation source.

The radiation source may be as a flash. The flash, for example, emits visible light. It is also possible, however, that the flash emits light in the infrared range, for example, for night shots.

To capture an image, the various subsets of the image elements may be selected and activated one after the other such that, viewed in plan view of a main side of the image sensor, a straight or curved front of active image elements moves over the main side. For example, each subset of the image elements is formed by one or more rows or columns, or a diagonal path of adjacent image elements along the main side, or a curved path of adjacent image elements along the main side. During capturing of an image, for example, adjacent subsets of the image elements are activated one after the other. The last activated subset then forms the image capturing front that moves along one direction, preferably exclusively along one direction, over the main side of the image sensor. A main side, for example, is a radiation entry surface of the image sensor.

A possible alternative is that each subset of the image elements consists of only one image element so that the image elements are activated and deactivated one after the other. For example, the image elements are activated and deactivated row by row from left to right or from right to left or column by column from top to bottom or from bottom to top. In this example, simultaneously active image elements can move as clusters over the main side of the image sensor.

To capture an image, the various subsets of the radiation elements may be selected and activated one after the other such that viewed in plan view of a main side of the radiation source, a straight or curved radiation front of active radiation elements moves over the main side. Again, it is possible that each subset of the radiation elements is formed by one or more rows or columns, or a diagonal path of adjacent radiation elements along the main side, or a curved path of adjacent radiation elements along the main side. During capturing of an image, for example, adjacent subsets of the radiation elements are activated one after the other. The last activated subset may then form the radiation front, which moves along one direction, preferably exclusively along one direction, over the main side of the radiation source. The main side of the radiation source, for example, is a radiation entrance surface.

Alternatively, it is also possible that the individual subsets of the radiation elements are formed by only one radiation element each. The individual radiation elements are then activated and deactivated line by line or column by column. Simultaneously active radiation elements then again form a cluster, for example, that can be moved over the main side of the radiation source by appropriate control.

The temporal and geometric course of the radiation front may follow the temporal and geometric course of the image capturing front. For example, if the image capturing front is a row or column or diagonal moving along a vertical or horizontal direction or along a diagonal direction across the main side of the image sensor, the radiation front is also a row or column or diagonal moving along the same direction. For example, movement of the radiation front and the image capturing front is started and stopped simultaneously.

The integrated circuit and the radiation source may be configured such that each radiation element can be controlled and operated individually and independently of the other radiation elements. Preferably, also, the image elements of the image sensor are activatable individually and independently of the other image elements.

The image elements may be arranged in the image sensor in the form of a matrix. For example, each subset of the image elements forms an entire row or column of the matrix. During capturing of an image, for example, the individual rows or columns are activated and deactivated one after the other. The same may apply to the radiation source.

The image sensor may be a CMOS sensor such as an active pixel sensor, or a CCD sensor. The radiation source, for example, is a pixelated LED chip.

The radiation source may comprise two, i.e. exactly two or more, pixelated LED chips.

The LED chips may emit radiation of different wavelength ranges during operation. For example, a first LED chip is configured for emission of cold white light with a color temperature of at least 4000 K or at least 5000 K. For example, a second LED chip is configured for emission of warm white light with a color temperature of at most 3300 K or at most 3000 K. The light from the two LED chips is particularly superimposed in this method.

At least some or all subsets of the radiation elements may comprise radiation elements of both LED chips. This means that during capturing of a single image, radiation elements from both LED chips are operated simultaneously, i.e. with a temporal overlap. This means that radiation from both LED chips is emitted during capturing of image information by a subset of the image elements.

For example, each LED chip has its own lens to image the emitted radiation. For example, the lenses are configured such that the radiation of the radiation elements of a subset of the radiation elements emitted by different LED chips is emitted into the same subregion of the image to be captured and superimposed there. This means that the lenses are configured to mix the radiation of the two LED chips.

To capture an image, the radiation source may be controlled by the integrated circuit on the basis of a first trigger signal. After the arrival of the first trigger signal, the integrated circuit may sequentially control the different subsets of the radiation elements and ensure that control of the subsets of the radiation elements is synchronized with the activation of the corresponding subsets of the image elements.

Only the first trigger signal at the beginning need be used to capture a single image. The integrated circuit may then sequentially control the subsets of the radiation elements without further trigger signals. In other words, in the integrated circuit it is predefined from the outset after which time intervals the individual subsets of the radiation elements are activated and deactivated. In this example, the trigger signal is only used to initiate the activation of the subsets. The temporal sequence is already preferably coordinated with the temporal sequence of the activation of the individual subsets of the image elements such that a single first trigger signal is sufficient to synchronize the activation of the radiation source and activation of the image sensor. Further trigger signals during capturing of the image for temporal fine-tuning between radiation source and image sensor are then not necessary.

A plurality of trigger signals may be used to capture a single image, and upon arrival of each new trigger signal, the integrated circuit controls a new subset of the radiation elements. For example, other trigger signals are used in addition to the first trigger signal. For example, when a subset of the image elements is activated or deactivated, a trigger signal is generated which is transmitted to the integrated circuit and used to improve the synchronization between the active subsets of the image elements and the associated active subsets of the radiation elements.

The subset of the radiation elements assigned to a subset of the image elements may be controlled by the integrated circuit such that the controlled radiation elements start with emission of radiation before or simultaneously with activation of the corresponding subset of the image elements. Deactivation of the subsets of the radiation elements preferably occurs simultaneously or after deactivation of the assigned subset or subsets of the image elements.

A plurality of different operating modes for capturing an image or capturing a single image may be stored or can be stored on the integrated circuit. In each operating mode, for example, the sequence of the controlled subsets of the radiation elements and/or the composition of the subsets from the different radiation elements are individually set. To capture an image, for example, a suitable operating mode is selected by a user or a computer. As soon as the operating mode is selected, for example, the composition of the subsets of the radiation elements and the temporal sequence in which the subsets of the radiation elements are activated are fixed for the capturing of the image.

For example, at different times of the day, different operating modes are suitable for different purposes. For example, each subset of the radiation elements in an operating mode comprises all radiation elements in a row or column. Such an operating mode is used, for example, in the morning or evening when the ambient light is low. At lunchtime, for example, an operating mode in which each subset of the radiation elements is formed by only every second radiation element in a row or column is more suitable since the ambient light is stronger and the flash can be selectively accordingly weaker.

However, different operating modes can also be selected if different optical effects are desired. For example, one mode improves white balance, another mode produces depth effects, and another mode produces interference effects. In these operating modes, for example, the sequence of activation of the subsets of the image elements is the same, but the sequence of activation of the subsets of the radiation elements and/or their composition is different.

The integrated circuit may be programmable. Different operating modes can be stored on the integrated circuit by programming. For example, the integrated circuit can only be programmed at the factory or can also be programmed by the user. For example, the control of the radiation source can also be adapted to the image sensors of different manufacturers that can vary with regard to the readout method or exposure sequence of the image sensor.

The integrated circuit may comprise both a control unit and a communication unit. For example, the communication unit receives external signals such as trigger signals or operating signals. The trigger signals or operating signals can, for example, come from an integrated circuit of the image sensor. External signals from other components such as processors in the camera system, are also possible. For example, the communication unit activates the control unit upon receiving of a first trigger signal, wherein after activation of the control unit the control unit controls the individual subsets of the radiation elements one after the other.

The communication unit may receive an external operating signal. The operating signal may inform the integrated circuit which operating mode is used to capture the image. The control unit may then control the corresponding subsets of the radiation elements. The operating signal may be transmitted to the communication unit by additional electronic components in the camera system, for example. In particular, the operating signal may be generated according to an operating mode selected by a user or a computer.

The integrated circuit may comprise a look-up table. In the look-up table, for example, information is stored for each operating mode as to which subsets of the radiation elements are to be controlled, in which order and at which times. According to the look-up table, the integrated circuit thus controls the corresponding different subsets of the radiation elements. It is possible, for example, to use trigger signals to inform the control unit which subset of the image elements is activated next and then to look up in the look-up table which subset of the radiation elements is assigned and must be controlled.

The camera system may comprise a processor. Based on ambient light information recorded by the camera system, the processor may determine how the subsets of the radiation elements assigned to the subsets of the image elements are composed to capture the image. This means that the composition of the subsets of the radiation elements and the temporal sequence in which they are controlled is not necessarily fixed from the outset, but is preferably determined promptly by the processor to capture the image. This enables, for example, a specially adapted control of the radiation source to current environmental conditions such as ambient light or movements within the image to be captured.

For example, the image sensor or another image sensor can take a first picture of an image to be captured. The processor then takes the brightness distribution in the scene, i.e. which areas of the scene are brighter or darker, from this picture and calculates accordingly how the subsets of the radiation elements must be composed and when they must be controlled to obtain the desired optical effects and image qualities in the image to be captured afterwards. The integrated circuit then implements the processor's calculations accordingly.

The processor may determine the subsets of the radiation elements in real time while the image is already being captured. For example, the processor determines the composition and chronological sequence of the subsets of controls for certain subsets of the image elements, while other subsets of the image elements have already been exposed or are being exposed.

We also provide a camera system. The camera system is particularly suitable for performing the method described above. All features disclosed for the method are therefore also disclosed for the camera system and vice versa.

The camera system may comprise an image sensor, a radiation source and an integrated circuit. The image sensor may comprise a plurality of activatable image elements, each image element being configured to receive image information. The radiation source may comprise a plurality of activatable radiation elements, each radiation element being configured to emit electromagnetic radiation. The integrated circuit may be electrically coupled to the radiation source to control the radiation source.

The camera system may be configured to perform a described method.

In the following, a method of operating a camera system as well as a camera system will be explained in more detail with reference to drawings on the basis of examples. Same reference signs indicate the same elements in the individual figures. However, the size ratios involved are not to scale, individual elements may rather be illustrated with an exaggerated size for a better understanding.

Figure 1A:
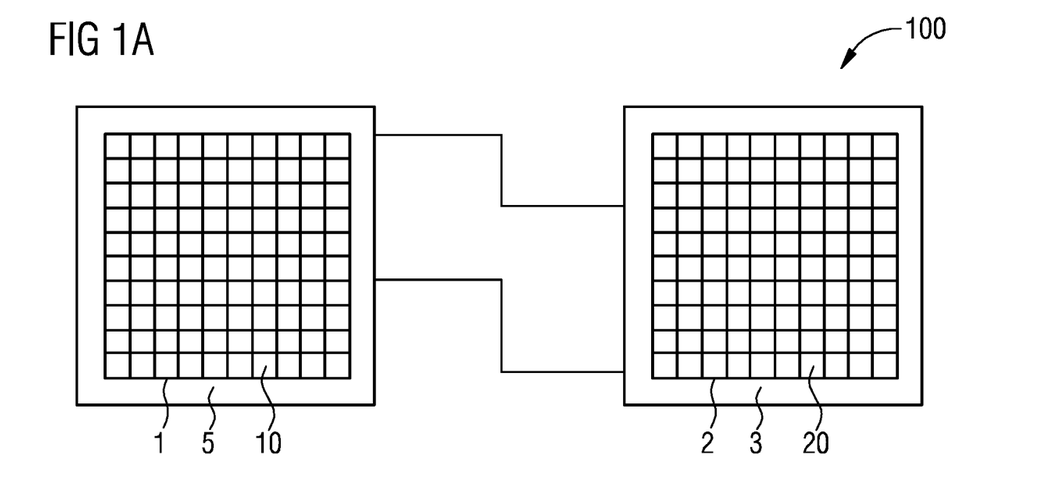
FIGS. 1A to 1D show examples of a camera system in different views.

FIG. 1A shows an example of a camera system 100 for the method. The camera system 100 comprises an image sensor 1 and a radiation source 2. The image sensor 1 and the radiation source 2 are separate elements that connect to each other by a controller, for example.

In this example, the image sensor 1 is a pixelated image sensor 1 such as a CMOS image sensor. The image sensor 1 has a plurality of activatable image elements 10 or pixels 10. An activated image element 10 can convert electromagnetic radiation, for example, visible light into readable image information. The image elements 10 are arranged exemplarily in a 10×10 matrix. In fact, the image sensor 1 can comprise considerably more than ten image elements 10, for example, more than $10^6$ image elements 10.

The radiation source 2 is a pixelated radiation source 2 with a plurality of radiation elements 20 or pixels 20. The radiation source 2 is, for example, a pixelated LED chip that generates a flash light, for example, in the visible range for the camera system 100 during operation. The radiation elements 20 of the radiation source 2 are also arranged in a 10×10 matrix, wherein radiation sources 2 with fewer or considerably more radiation elements 20 are also possible.

The radiation source 2 in FIG. 1A is arranged on an integrated circuit 3 and electrically connected to it. The integrated circuit 3 is used to control the radiation source 2. For example, the radiation source 2 and the integrated circuit 3 are configured such that each radiation element 20 can be controlled individually and independently of the other radiation elements 20.

The image sensor 1 is also arranged on a further integrated circuit 5 and electrically connected to it. The further integrated circuit 5, for example, activates the individual image elements 10 as well as reads out or forwards the image information captured by the individual image elements 10. For example, the image elements 10 can also be activated individually and independently of each other.

The integrated circuit 3 as well as the further integrated circuit 5 electrically connect to each other in FIG. 1A and can communicate with each other during operation. In this way, the integrated circuit 2 can be informed, for example, which image elements 10 of the image sensor 1 are currently activated or will be activated next. For example, trigger signals can be generated and transmitted in this way.

Figure 1B:
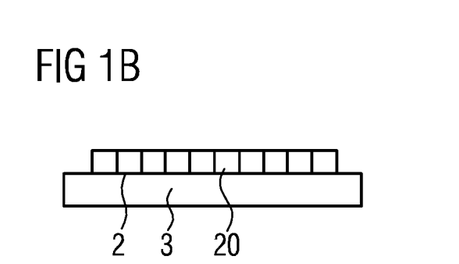
Figure 1C:
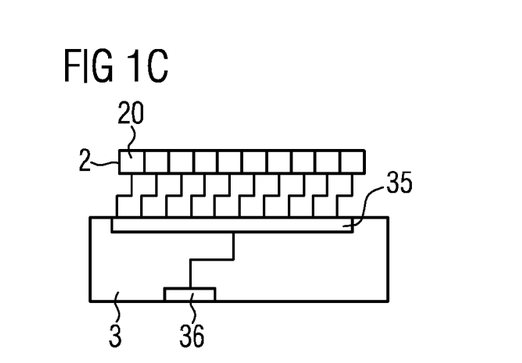
Figure 1D:
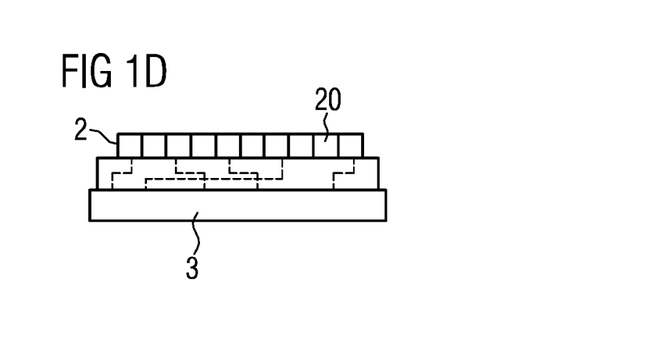

The examples in FIGS. 1B, 1C and 1D show the radiation source 2 and the corresponding integrated circuit 3.

In FIG. 1B, the radiation source 2 is arranged directly on the integrated circuit 3 and mechanically connected to it such that the radiation source 2 and the integrated circuit 3 mechanically stabilize each other. The radiation source 2 and the integrated circuit 3 electrically connect to each other.

In FIG. 1C, however, the radiation source 2 and the integrated circuit 3 only electrically connect to each other, but are spatially separated from each other so that the radiation source 2 and the integrated circuit 3 do not mechanically stabilize each other.

Moreover, FIG. 1C shows the integrated circuit in more detail. The integrated circuit 3 has a communication unit 36 and a control unit 35. The communication unit 36 is used, for example, to receive external signals such as trigger signals or operating signals. The control unit 35 is used to control and activate the radiation source 2 or the individual radiation elements 20. Although the communication unit 36 and the control unit 35 are only shown in FIG. 1C, these units can also be present in any other integrated circuit of the examples.

In the example of FIG. 1D, the radiation source 2 is arranged indirectly on the integrated circuit 3 via an intermediate layer or an intermediate carrier. The intermediate carrier has a wiring through which the integrated circuit 3 and the radiation source 2 are electrically coupled. The radiation source 2 and the integrated circuit 3 are mechanically coupled to each other via the intermediate carrier and stabilize each other.

Figure 2A:
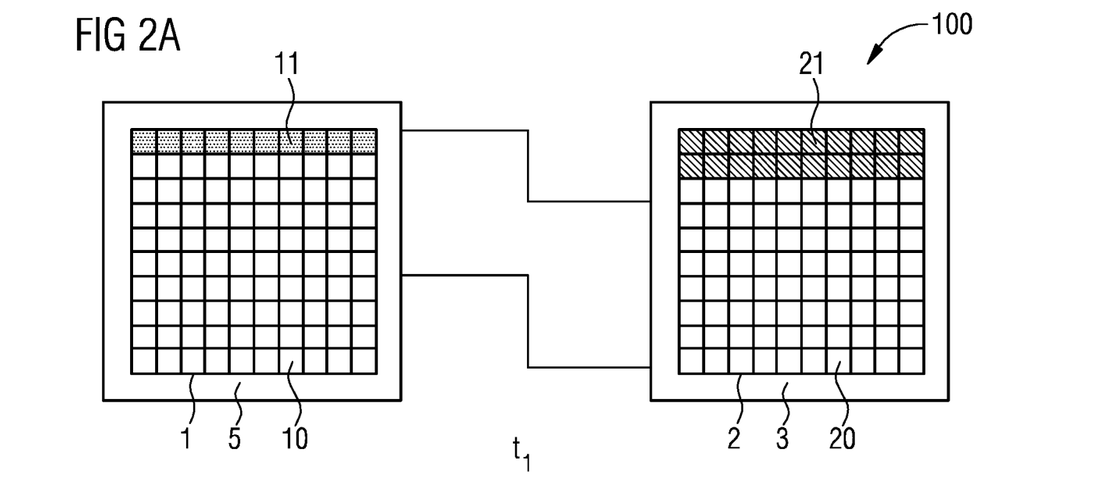
FIGS. 2A to 2D, 3A and 3B show different positions in examples of a method of operating the camera system.

FIG. 2A shows a position in an example of the method of operating the camera system 100. FIG. 2A shows the camera system 100 at a time $t_1$ in which a first subset 11 of the image elements 10 is active. This is represented by a shading of the corresponding image elements 10. The active image elements 10 convert electromagnetic radiation into image information. In this example, the first subset 11 of the image elements 10 is an entire line of the image sensor 1.

At the same time, a first subset 21 of the radiation elements 20 assigned to the first subset 11 of the image elements 10 is active, wherein the active radiation elements emit 20 electromagnetic radiation. The active radiation elements 20 are also represented by a shading. In this example, the first subset 21 of the radiation elements 20 consists of two lines of the radiation source 2.

Figure 2B:
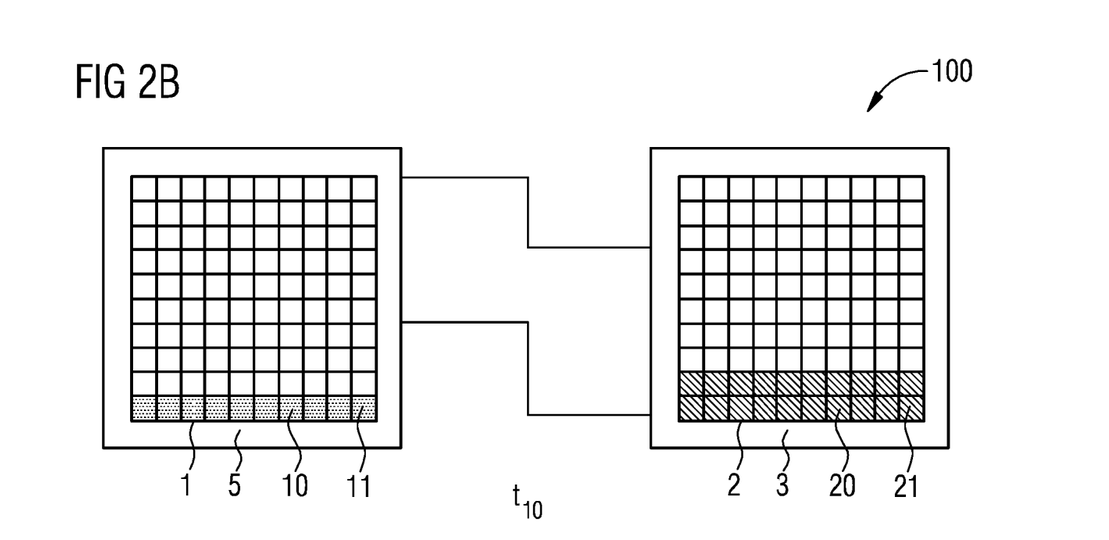

FIG. 2B shows a position in the example of the method at a later time $t_{10}$. At this time $t_{10}$, a tenth subset 11 of the image elements 10 is active. The tenth subset 11 of the image elements 10 is also assigned another, namely a fifth subset 21 of the radiation elements 20 that is active at the same time.

The times $t_1$ and $t_{10}$ are, for example, points in time during the capturing of a single image, for example, the first and last points in time during the capturing.

Figure 2C:
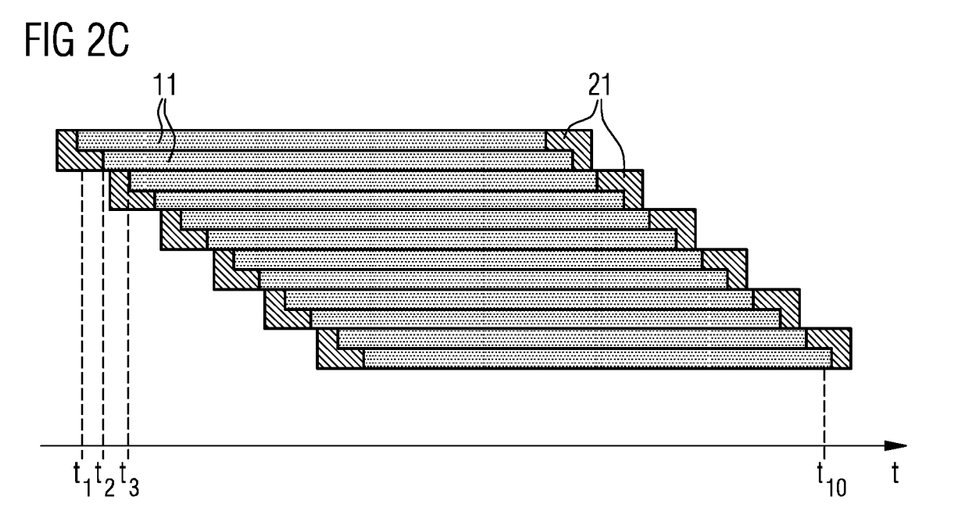

FIG. 2C shows a schematic representation of the sequence of the example of the method. For example, the method shown in FIG. 2C is used to capture a single image. The thin bars 11 shown show different active subsets 11 of the image elements 10. Behind the thin bars 11 thicker bars 21 are shown representing active subsets 21 of the radiation elements 20. An overlap of the thin bars 11 with the thick bars 21 illustrates which subsets 11 of the image elements 10 are assigned to which subsets 21 of the radiation elements 20. In this example, the two uppermost subsets 11 of the image elements 10 are therefore both assigned to the same subset 21 of the radiation elements 20.

At time $t_1$, which is also shown in FIG. 2A, the first subset 11 of the image elements 10 is activated. The assigned first subset 21 of the radiation elements 21 is already activated at time $t_1$. At a later time $t_2$, the second subset 11 of the image elements 10 is activated. After a given exposure time, the first subset 11 of the image elements 10 is deactivated and again, at a later time, but after the same exposure time, the second subset 11 of the image elements 10 is also deactivated. During the entire time in which the first and second subset 11 of the image elements 10 are active, the assigned first subset 21 of the radiation elements 20 is also active. Only after the first and second subset 11 of the image elements 10 have been switched off, the first subset 21 of the radiation elements 20 is deactivated. The assigned first subset 21 of the radiation elements 20 thus emits radiation continuously in the period in which the assigned first and second subset 11 of the image elements 10 are exposed.

A third subset 11 of the image elements 10 is activated or exposed after time $t_2$ at time $t_3$. The third subset 11 of the image elements 10 is assigned a second subset 21 of the image elements 20, which is formed by the third and fourth line of the radiation source 2. The second subset 21 of the radiation elements 20 is activated shortly before time $t_3$ but here as an example after time $t_2$.

At the time $t_{10}$ that is also shown in FIG. 2B, only a tenth subset 11 of the image elements 10, presently formed by the tenth line of the image sensor 1, and an assigned fifth subset 21 of the radiation elements 20, presently exemplarily formed by the ninth and tenth lines of the radiation source 2, is active. Shortly after time $t_{10}$, these are also deactivated and the image capturing is stopped.

FIG. 2C shows that no subset 21 of the radiation elements 20 is activated during the entire time of image capturing. This allows the camera system 100 to be operated in a particularly energy-saving manner. In addition, brightness conditions in the image can be supported such that overexposure or underexposure of certain objects can be avoided, thus improving the image quality.

Unlike the example shown in FIG. 2C, however, it is also possible, for example, that each subset 21 of the radiation elements 20 is simultaneously activated with the first assigned subset 11 of the image elements 10 and is switched off simultaneously with the last assigned subset 11 of the image elements 10. For example, the subsets 21 of the radiation elements 20 would only emit light if an assigned subset 11 of the image elements 10 is also currently active.

Figure 2D:
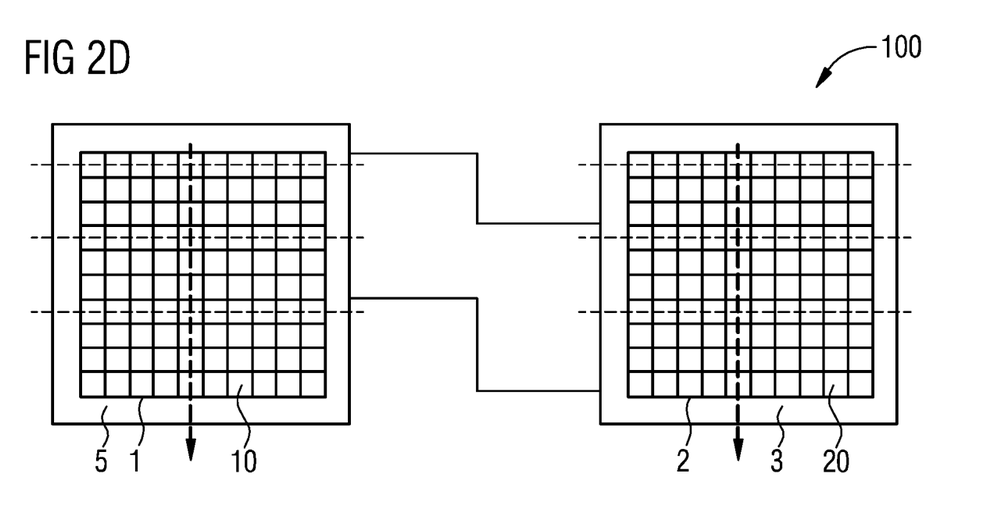

FIG. 2D illustrates how an image capturing front moves over a main side of the image sensor 1 during the method described in connection with FIGS. 2A to 2C. The subsets 11 of the image elements 10 that are formed as lines, are activated one after the other. The image capturing front is each formed by the last activated subset 11 of the image elements 10 and moves along the dotted arrow during image capturing. The dotted lines illustrate the position of the image capturing front at different times.

Accordingly, during the described method, a radiation front of active radiation elements 20 moves over a main side of the radiation source 2. The position of the radiation front at different times is again represented by horizontal dashed lines. The radiation front moves from top to bottom along the dotted arrow.

Figure 3A:
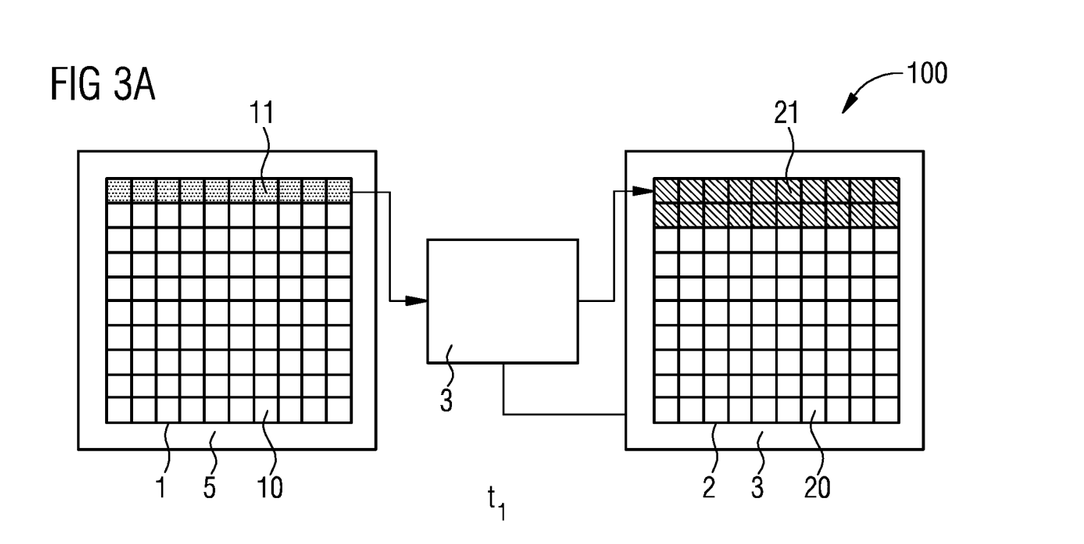
Figure 3B:
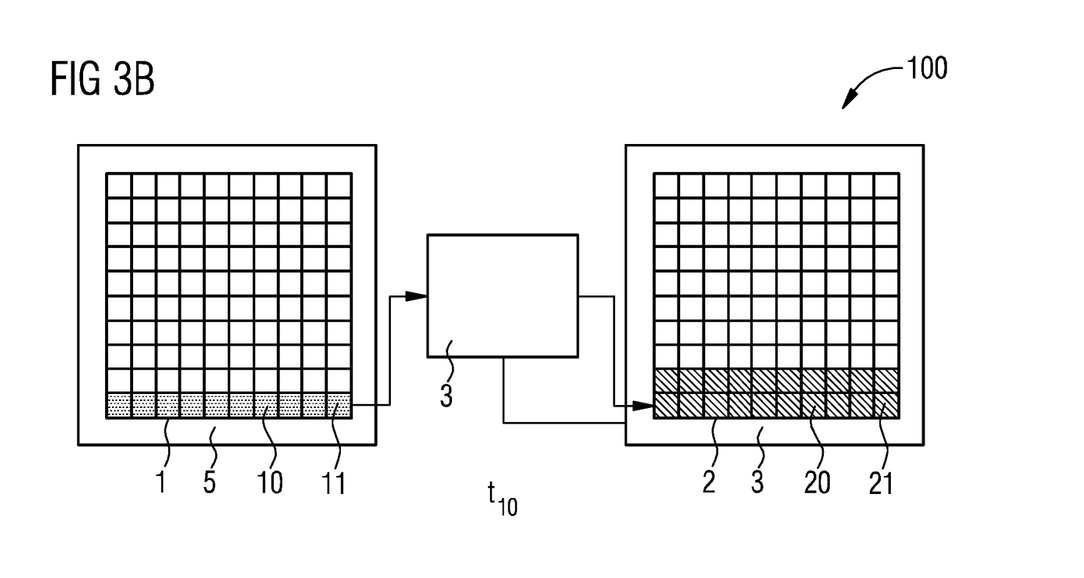

FIGS. 3A and 3B show the same positions in examples of the method as shown in FIGS. 2A and 2B. Selection of the active subset 21 of the radiation elements 20 is made as an example using a look-up table that is shown as a rectangular box between the image sensor 1 and the radiation source 2, but which can still be stored on the integrated circuit 3. For example, the integrated circuit 3 of the radiation source communicates with the further integrated circuit 5 of the image sensor 1. In this way, it obtains information, for example, about which subsets 11 of the image elements 10 are active or will be activated next. For example, information about which subset 21 of the radiation elements 20 is the appropriate one according to a previously selected operating mode is stored in the look-up table. Using these, the integrated circuit 3 then controls the appropriate subset 21 of the radiation elements 20.

Figure 4A:
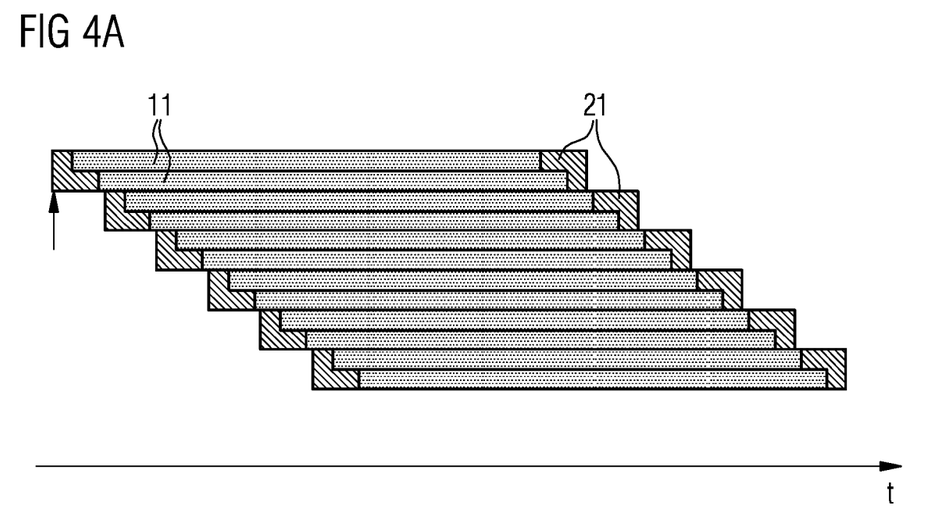
FIGS. 4A, 4B, 5A to 5C, 6A and 6B show different examples of a method of operating the camera system.

FIGS. 4A and 4B show a schematic representation of the method as shown in FIG. 2C. In the method shown in FIG. 4A, a first trigger signal, represented by the vertical arrow, is used at the beginning of an image capture. When the first trigger signal is received, the integrated circuit 3 starts the control of the subsets 21 of the radiation elements 20, e.g. according to a fixed sequence. The trigger signal is used to synchronize the image capturing by the image sensor 1 with the control of the radiation source 2.

Figure 4B:
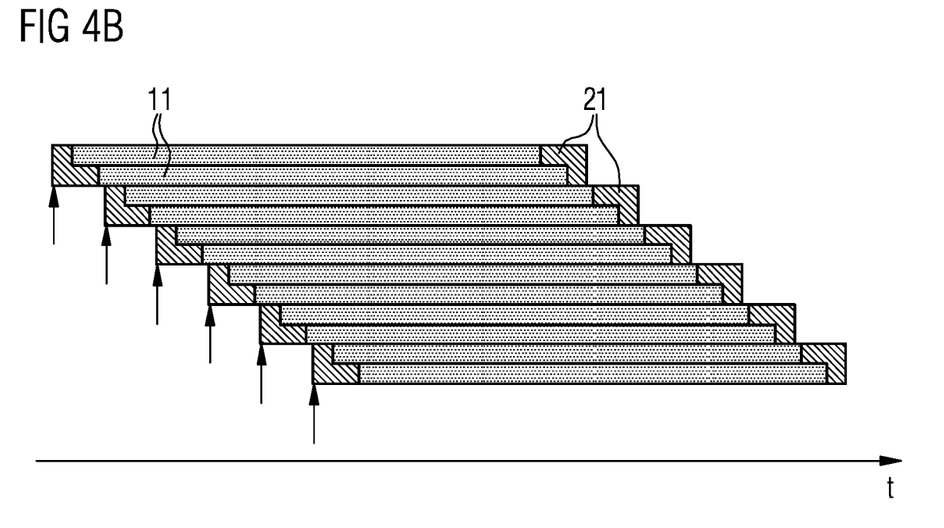

In FIG. 4B, several trigger signals are used. After the arrival of each trigger signal, the integrated circuit 3 activates a new subset 21 of the radiation elements 20. By using several trigger signals, the synchronization between the assigned subsets 11, 21 of the image elements 10 and the radiation elements 20 can also be improved during image capturing.

In the previous examples, the subsets 11 of the image elements 10 and the subsets 21 of the radiation elements 20 were always lines of the image sensor 1 or the radiation source 2. The different subsets can, however, be constructed quite differently.

Figure 5A:
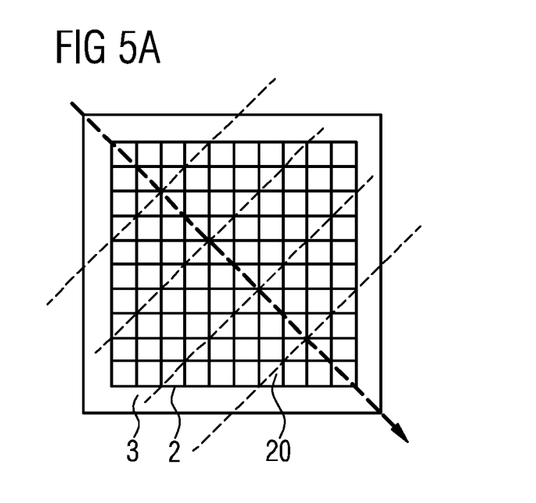
Figure 5B:
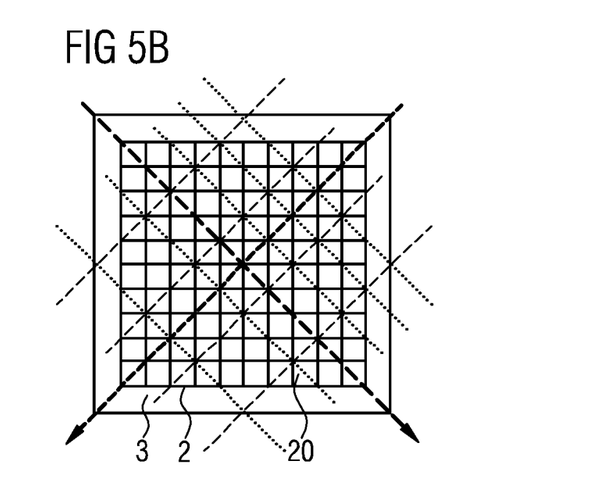
Figure 5C:
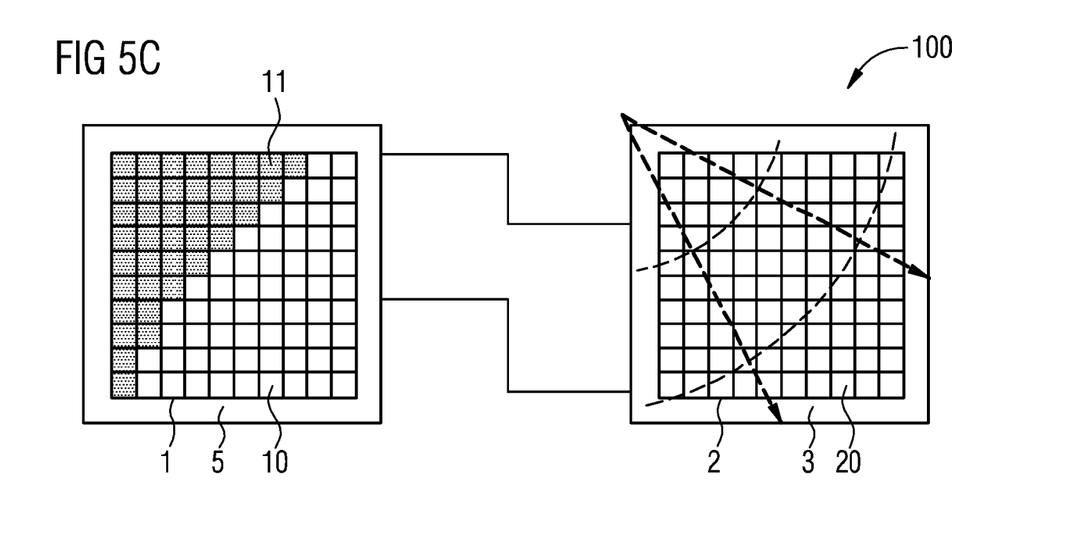

FIGS. 5A to 5C show different examples of how different radiation fronts can be generated by selecting different subsets 21 of the radiation elements 20 that move over the radiation source 2 during capturing of an image. The radiation fronts shown are, for example, radiation fronts in different operating modes. For example, the parallel exposure of image sensor 1 can be the same in all operating modes as shown in FIG. 5C.

In the example of the method of FIG. 5A, each subset 21 of the radiation elements 2 is formed by a diagonal path of radiation elements 20 arranged diagonally next to each other. By activating the subsets 21 of the radiation elements 20, a radiation front runs diagonally across the radiation source 2, as shown by the dotted arrow.

FIG. 5B shows an example of the method in which with the same procedure two diagonally running radiation fronts that cross each other are produced. For example, the two radiation fronts are started simultaneously each at one corner of the radiation source 2 and reach the diagonally opposite corner of the radiation source 2 at the same time.

FIG. 5C shows how a curved radiation front is generated. For example, the different subsets 21 of the radiation elements form 20 curved paths. By activating the subsets 21 of the radiation elements 20 one after the other, a kind of a spherical wave with a curved radiation front (dotted line) is created that propagates over the main side of the radiation source 2.

In FIG. 5C, the image sensor 1 is also shown at a certain time of the process, e.g. when the radiation front has propagated just half of the distance over the main side of the radiation source 2. An image capturing front is also formed on the image sensor 1, which at the time shown extends approximately over the entire diagonal of image sensor 1. The image capturing front is formed by the last activated subset 11 of the image elements 10.

Figure 6A:
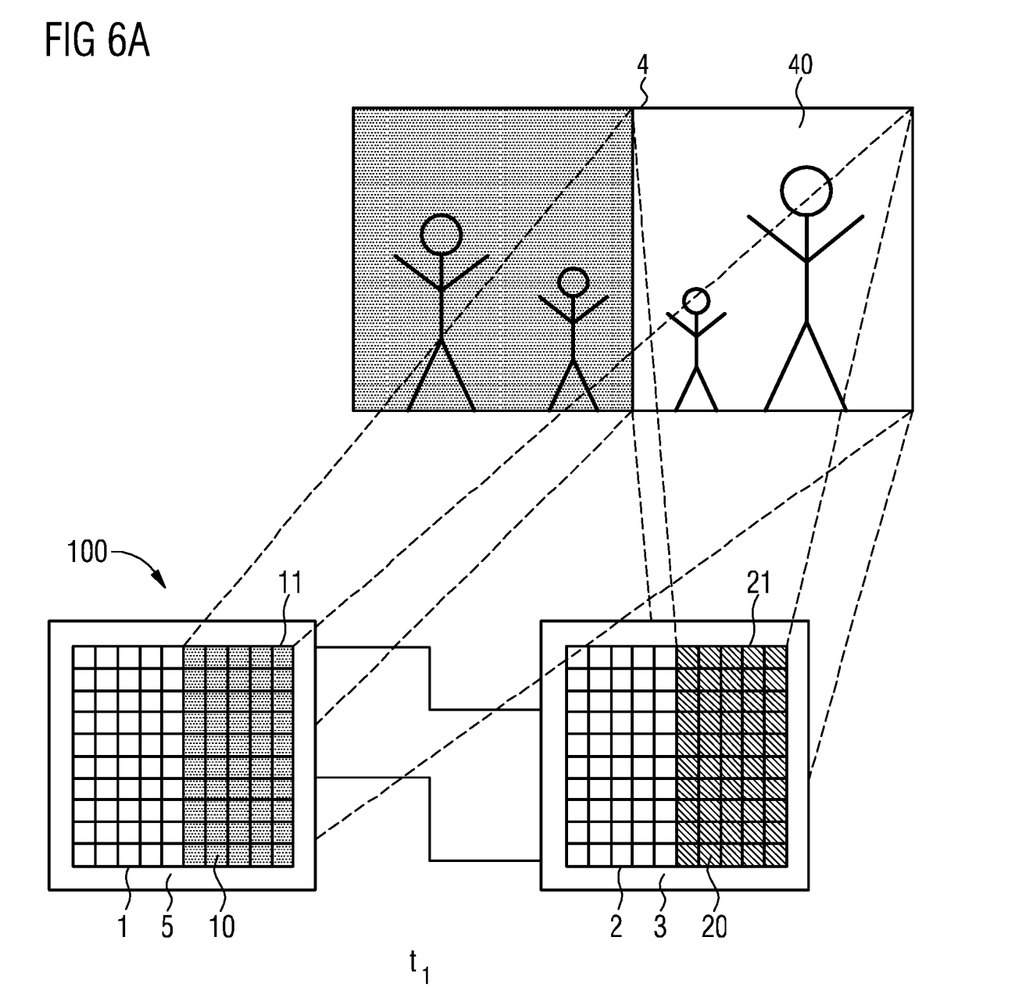
Figure 6B:
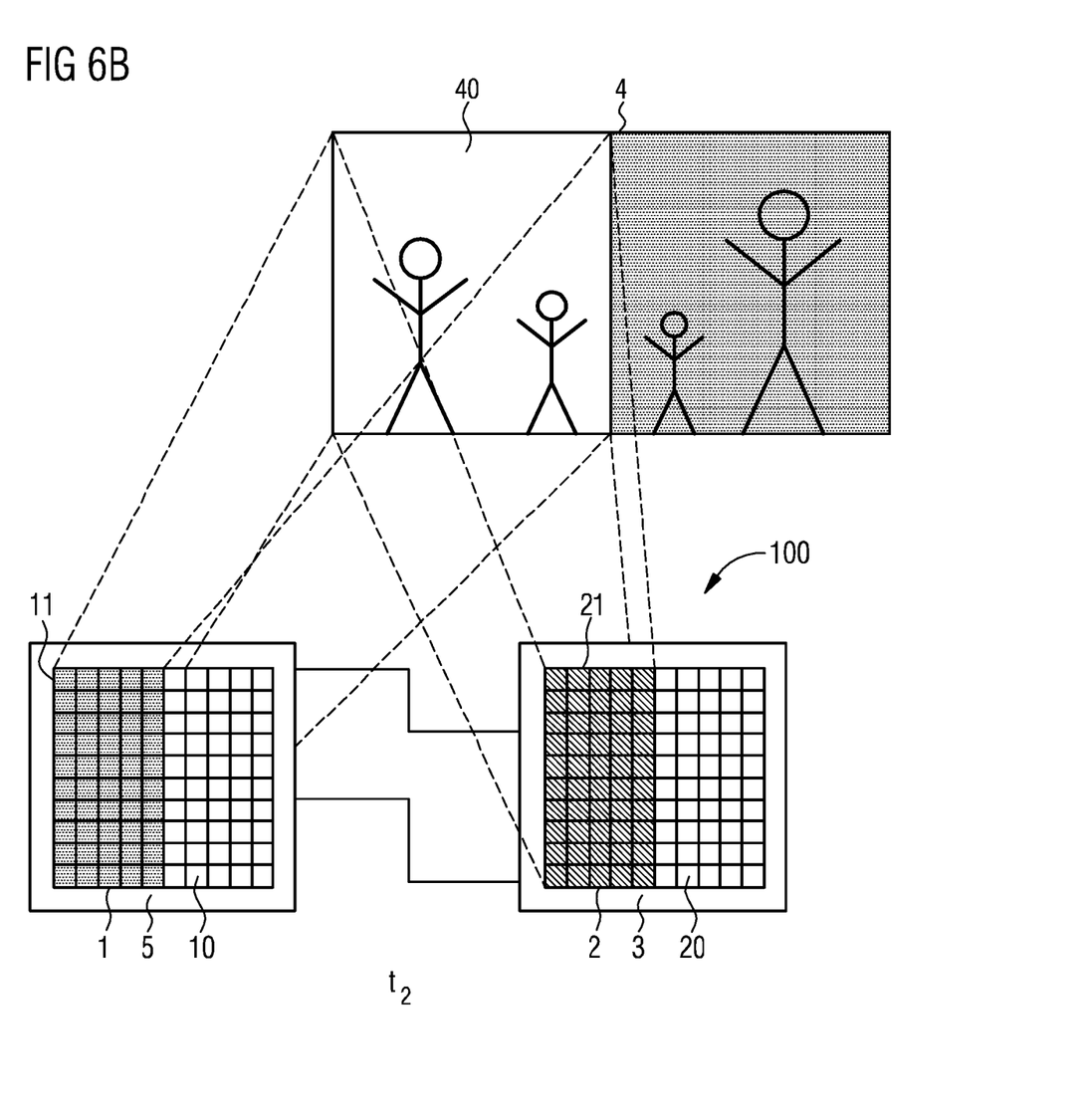

FIGS. 6A and 6B show an example of the method at two different times $t_1$ and $t_2$. Using the method shown in the example of FIGS. 6A and 6B, an image 4 is captured that, for example, comprises a family of four persons.

In FIG. 6A, at time $t_1$, only the right subregion 40 of the image 4 is captured with the image sensor 1. For this purpose, at time $t_1$, only a first subset 11 of the image elements 10 is active, which is represented by the shading. At the same time, an assigned first subset 21 of the radiation elements 20 of the image sensor 2 is active, which is again represented by the shading. This first subset 21 of the radiation elements 20 is selected so that it illuminates the same subregion 40 captured by image sensor 1 at this time.

At the later time $t_2$ shown in FIG. 6B, a second subset 11 of the image elements 10 is active. This second subset 11 of the image elements 10 captures the left subregion 40 of the image 4. At the same time, the assigned second subset 21 of the radiation elements 20 is active, which illuminates exactly this subregion 40.

With the described method it is possible, for example, to expose the whole image 4 with the radiation source 2 without all radiation elements 20 of the radiation source 2 having to be continuously active during the image capturing. In this way energy can be saved.

The systems and methods described herein are not limited by the description in conjunction with the examples. Rather, this disclosure comprises any new feature as well as any combination of features, particularly including any combination of features in the appended claims, even if the feature or combination per se is not explicitly stated in the claims or examples.

This application claims priority of DE application 10 2017 103 882.5, the subject matter of which is incorporated herein by reference.

The invention claimed is:

1. A method of operating a camera system having an image sensor, a radiation source and an integrated circuit, wherein
    the image sensor comprises a plurality of activatable image elements, wherein an active image element converts incoming radiation into readable image information;
    the radiation source comprises a plurality of activatable radiation elements, each active radiation element emitting electromagnetic radiation;
    the integrated circuit is electrically coupled to the radiation source to control the radiation source;
    the method comprising capturing at least one image, wherein during capturing of each single image
    different subsets of the image elements are successively each once activated and deactivated again after a predetermined exposure time,
    different subsets of the radiation elements are successively activated by the integrated circuit and deactivated again after a predetermined emission time, and
    each subset of the image elements is assigned a subset of the radiation elements activated with temporal overlap so that the active radiation elements emit radiation while the associated active image elements receive image information,
    wherein
    when activating each individual subset of the image elements, a subregion of the image to be captured is captured,
    the respectively assigned and simultaneously active subset of the radiation elements emits radiation into the same subregion and illuminates this subregion more strongly than other regions of the image.

2. The method according to claim 1, wherein, during capturing an image, no subset of the radiation elements emits radiation over an entire period from activation of a first activated subset of the image elements until deactivation of a last activated subset of the image elements.

3. The method according to claim 1, wherein, to capture an image, the various subsets of the image elements are selected and activated one after the other such that, viewed in plan view of a main side of the image sensor, a straight or curved image capturing front of active image elements moves over the main side.

4. The method according to claim 1, wherein, to capture an image, the various subsets of the radiation elements are selected and activated one after the other such that, viewed in plan view of a main side of the radiation source, a straight or curved radiation front of active radiation elements moves over the main side.

5. The method according to claim 3, wherein the temporal and geometric course of the radiation front reproduces the temporal and geometric course of the image capturing front.

6. The method according to claim 1, wherein
    in the image sensor, the image elements are arranged in the form of a matrix,
    each subset of the image elements is a row or column of the matrix,
    while capturing an image, the individual rows or columns are activated and deactivated one after the other.

7. The method according to claim 1, wherein
    the image sensor is a CMOS sensor or a CCD sensor, and
    the radiation source is a pixelated LED chip.

8. The method according to claim 1, wherein
    the radiation source comprises two pixelated LED chips,
    the LED chips emit radiation of different wavelength ranges during operation, and
    at least some subsets of the radiation elements comprise radiation elements of both LED chips.

9. The method according to claim 1, wherein during capturing an image
    the integrated circuit controls the radiation source on the basis of a first trigger signal, and
    after arrival of the first trigger signal, the integrated circuit successively controls the different subsets of the radiation elements and ensures that control of the subsets of the radiation elements takes place synchronously with activation of the corresponding subsets of the image elements.

10. The method according to claim 9, wherein, to capture a single image, only the first trigger signal at the beginning is used and thereafter the integrated circuit successively controls the subsets of the radiation elements without further trigger signals.

11. The method according to claim 9, wherein, to capture a single image, a plurality of trigger signals is used and, upon arrival of each Previously Presented trigger signal, the integrated circuit controls a Previously Presented subset of the radiation elements.

12. The method according to claim 1, wherein the subset of the radiation elements assigned to a subset of the image elements is controlled by the integrated circuit such that the controlled radiation elements start with emission of radiation before or simultaneously with activation of the corresponding subset of the image elements.

13. The method according to claim 1, wherein
a plurality of different operating modes of capturing of an image can be stored or is stored on the integrated circuit,
in each operating mode, the sequence of the controlled subsets of the radiation elements and/or the composition of the subsets from the different radiation elements is set individually,
to capture an image, an appropriate operating mode is selected by a user or computer.

14. The method according to claim 1, wherein
the integrated circuit comprises both a control unit and a communication unit,
the communication unit receives external signals and activates the control unit upon receiving a first trigger signal,
after activation of the control unit, the control unit controls the radiation source.

15. The method according to claim 13, wherein
the communication unit receives an external operating signal,
with the operating signal, the integrated circuit is informed which operating mode is used to capture the image,
the control unit controls the corresponding subsets of the radiation elements.

16. The method according to claim 1, wherein the integrated circuit comprises a look-up table and drives the different subsets of the radiation elements according to the look-up table.

17. The method according to claim 1, wherein
the camera system comprises a processor,
environmental information is recorded by the camera system on the basis of which the processor determines how the subsets of the radiation elements assigned to the subsets of the image elements are composed to capture the image.

18. The method according to claim 17, wherein the processor determines the subsets of the radiation elements in real time while the image is captured.

19. A camera system comprising an image sensor, a radiation source and an integrated circuit, wherein
the radiation source comprises a pixelated LED chip having an active layer, wherein the active layer is segmented according to the pixels;
the image sensor comprises a plurality of activatable image elements, each image element being configured to receive image information;
the radiation source comprises a plurality of activatable radiation elements, and each radiation element is configured to emit electromagnetic radiation; and
to control the radiation source, the integrated circuit is electrically coupled to the radiation source;
wherein the camera system is configured to perform a method according to claim 1.

20. A method of operating a camera system having an image sensor, a radiation source and an integrated circuit, wherein
the radiation source comprises a pixelated LED chip having an active layer, wherein the active layer is segmented according to the pixels;
the image sensor comprises a plurality of activatable image elements, wherein an active image element converts incoming radiation into readable image information;
the radiation source comprises a plurality of activatable radiation elements, and each active radiation element emits electromagnetic radiation;
the integrated circuit is electrically coupled to the radiation source to control the radiation source;
wherein the method comprises capturing at least one image, wherein during capturing of each single image,
different subsets of the image elements are successively each once activated and deactivated again after a predetermined exposure time,
different subsets of the radiation elements are successively activated by the integrated circuit and deactivated again after a predetermined emission time, and
each subset of the image elements is assigned a subset of the radiation elements that are activated with temporal overlap so that the active radiation elements emit radiation while the associated active image elements receive image information.

* * * * *